(12) United States Patent
Bekemeier et al.

(10) Patent No.: US 10,774,217 B2
(45) Date of Patent: Sep. 15, 2020

(54) ADDITIVE ORGANOPOLYSILOXANE COMPOSITION, CURABLE COMPOSITION, AND FILM

(71) Applicant: DOW SILICONES CORPORATION, Midland, MI (US)

(72) Inventors: Tom Bekemeier, Midland, MI (US); Steve Cray, Midland, MI (US); Lori Dehlin, Midland, MI (US); Tim Mitchell, Midland, MI (US); Sze-Sze Ng, Midland, MI (US); Dave Rich, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 16/634,688

(22) PCT Filed: Jan. 11, 2019

(86) PCT No.: PCT/US2019/013206
§ 371 (c)(1),
(2) Date: Jan. 28, 2020

(87) PCT Pub. No.: WO2019/140197
PCT Pub. Date: Jul. 18, 2019

(65) Prior Publication Data
US 2020/0231809 A1  Jul. 23, 2020

Related U.S. Application Data

(60) Provisional application No. 62/616,701, filed on Jan. 12, 2018.

(51) Int. Cl.
C09D 183/04 (2006.01)
C08L 83/04 (2006.01)
C09J 7/40 (2018.01)

(52) U.S. Cl.
CPC ............ C08L 83/04 (2013.01); C09D 183/04 (2013.01); C09J 7/401 (2018.01); C08L 2205/025 (2013.01); C08L 2205/035 (2013.01); C09J 2483/005 (2013.01)

(58) Field of Classification Search
CPC ....... C08L 83/04; C09D 183/04; C09J 183/04
See application file for complete search history.

(56) References Cited

U.S. PATENT DOCUMENTS

| | | |
|---|---|---|
| 5,310,601 A | 5/1994 | Riding |
| 5,360,833 A | 11/1994 | Eckberg et al. |
| 5,369,205 A | 11/1994 | Eckberg et al. |
| 5,391,673 A | 2/1995 | Ekeland et al. |
| 5,446,087 A | 8/1995 | Chizat et al. |
| 5,468,816 A | 11/1995 | Hurford et al. |
| 5,468,828 A | 11/1995 | Hurford et al. |
| 5,486,578 A | 1/1996 | Carpenter, II et al. |
| 5,696,211 A | 12/1997 | Chung et al. |
| 5,708,075 A | 1/1998 | Chung et al. |
| 5,741,439 A | 4/1998 | Armstrong et al. |
| 5,866,222 A | 2/1999 | Seth et al. |
| 6,124,419 A | 9/2000 | Armstrong et al. |
| 6,806,339 B2 | 10/2004 | Cray et al. |
| 7,592,412 B2 | 9/2009 | Cray et al. |
| 7,846,550 B2 | 12/2010 | Ooms et al. |
| 7,893,128 B2 | 2/2011 | Busch et al. |
| 8,829,144 B2 | 9/2014 | Magee et al. |
| 8,933,177 B2 | 1/2015 | Hori et al. |
| 9,403,968 B2 | 8/2016 | Ihara et al. |
| 9,487,677 B2 | 11/2016 | Griswold et al. |
| 9,758,675 B2 * | 9/2017 | Yamamoto .............. C08G 77/44 |
| 2005/0020764 A1 * | 1/2005 | Dhaler .................... C08L 83/06 524/588 |
| 2007/0289495 A1 * | 12/2007 | Cray ...................... C08G 77/20 106/287.14 |
| 2009/0171055 A1 | 7/2009 | Kilgour et al. |
| 2010/0068538 A1 | 3/2010 | Fisher |
| 2011/0281123 A1 * | 11/2011 | Yoshida .................. C08L 83/04 428/447 |
| 2012/0328863 A1 | 12/2012 | Kuo |
| 2015/0119518 A1 | 4/2015 | Yamamoto et al. |
| 2016/0053056 A1 | 2/2016 | Gould et al. |
| 2017/0022395 A1 | 1/2017 | Griswold et al. |

FOREIGN PATENT DOCUMENTS

| | | |
|---|---|---|
| CN | 1784471 A | 6/2006 |
| CN | 101356237 A | 1/2009 |
| CN | 102676057 A | 9/2012 |
| EP | 0 216 376 B1 | 8/1991 |
| EP | 0 617 094 A2 | 9/1994 |
| EP | 1 070 734 A2 | 1/2001 |
| JP | 2742835 B2 | 4/1998 |
| JP | 4700463 B2 | 6/2011 |
| WO | 2008/019953 A1 | 2/2008 |
| WO | 2010/061967 A1 | 6/2010 |
| WO | 2017/087351 A1 | 5/2017 |

OTHER PUBLICATIONS

International Search Report for PCT/US2019/013206 dated Jan. 4, 2019, 3 pages.

(Continued)

Primary Examiner — Marc S Zimmer
(74) Attorney, Agent, or Firm — Warner Norcross + Judd LLP

(57) ABSTRACT

An (A) additive organopolysiloxane composition is disclosed which comprises (A1) a branched organopolysiloxane polymer comprising M, D and Q siloxy units and (A2) a silicone resin. The (A) additive organopolysiloxane composition has a content of aliphatically unsaturated groups of from 1.5 to 7.0 wt. %. A curable composition is also disclosed, the curable composition comprising the (A) additive organopolysiloxane composition, (B) an organosilicon compound having at least two silicon-bonded hydrogen atoms per molecule, and (C) a hydrosilylation catalyst. A method of preparing the curable and a method of forming a film with the curable composition are also disclosed.

14 Claims, No Drawings

(56) References Cited

OTHER PUBLICATIONS

Machine-assisted English translation of CN 102676057 obtained from https://worldwide.espacenet.com on Jan. 27, 2020, 11 pages.
Machine-assisted English translation of EP 0 617 094 obtained from https://worldwide.espacenet.com on Jan. 27, 2020, 20 pages.
Machine-assisted English translation of JP 2742835 obtained from https://worldwide.espacenet.com on Jan. 27, 2020, 13 pages.
Machine-assisted English translation of JP 4700463 obtained from https://worldwide.espacenet.com on Jan. 27, 2020, 23 pages.
Machine assisted English translation of CN1784471A obtained from https://patents.google.com/patent on Jun. 24, 2020, 19 pages.

\* cited by examiner

ADDITIVE ORGANOPOLYSILOXANE COMPOSITION, CURABLE COMPOSITION, AND FILM

CROSS-REFERENCE TO RELATED APPLICATIONS

This application is the National Stage of International Appl. No. PCT/US2019/013206 filed on 11 Jan. 2019, which claims priority to and all advantages of U.S. Appl. No. 62/616,701 filed on 12 Jan. 2018, the contents of which are hereby incorporated by reference.

FIELD OF THE INVENTION

The present invention generally relates to an additive organopolysiloxane composition and, more specifically, an additive organopolysiloxane composition and a curable composition comprising the same, which forms films having excellent release properties.

DESCRIPTION OF THE RELATED ART

Silicone compositions are known in the art and utilized in myriad industries and end use applications. One such end use application is to form release liners from which adhesives can be removed. For example, silicone compositions may be utilized to coat various substrates, such as paper, to give release liners for laminating pressure sensitive adhesives (e.g. tapes). Such silicone compositions are typically addition-curable.

Conventional release liners are typically formed by addition reacting an organopolysiloxane having an unsaturated hydrocarbon group and an organohydrogenpolysiloxane in the presence of a hydrosilylation reaction catalyst. However, the releasing force of conventional release liners is often undesirably low. For example, in hand peel applications, a low release force often leads to undesirable dispensing of a label.

SUMMARY OF THE INVENTION

The present invention provides (A) additive organopolysiloxane composition. The (A) additive organopolysiloxane comprises (A1) a branched organopolysiloxane polymer having the following general formula:

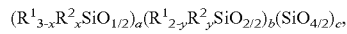

wherein each $R^1$ independently is a substituted or unsubstituted hydrocarbyl group; each $R^2$ independently is an aliphatically unsaturated group; x is from 0 to 3, y is from 0 to 2, with the proviso that x and y are not simultaneously 0; $0 < a \le 0.3$, $0.4 \le b \le 0.97$, and $0 < c \le 0.3$, with the proviso that $a+b+c=1$. The (A1) branched organopolysiloxane polymer has an average of at least three $R^2$ groups per molecule.

The (A) additive organopolysiloxane composition further comprises (A2) a silicone resin having the following general formula:

wherein each $R^1$ and $R^2$ is independently selected and defined above; $0.2 \le d \le 0.7$, $0.3 \le e \le 0.8$, with the proviso that $d+e=1$; wherein z is from 0 to 3 with the proviso that the (A2) silicone resin includes a content of $R^2$ of from 1.5 to 7.0 weight percent (wt. %) based on the total weight of the (A2) silicone resin. The (A) additive organopolysiloxane composition has a content of aliphatically unsaturated groups of from 1.5 to 7.0 wt. %

The present invention also provides a curable composition. The curable composition comprises the (A) additive organopolysiloxane composition. The curable composition further comprises (B) an organosilicon compound having at least two silicon-bonded hydrogen atoms per molecule. In addition, the curable composition comprises (C) a hydrosilylation catalyst.

A method of preparing the curable composition is also provided. The method comprises combining the (A) additive organopolysiloxane, the (B) organosilicon compound having at least two silicon-bonded hydrogen atoms per molecule, and the (C) hydrosilylation catalyst to give the curable composition.

In addition, a method of forming a film with the curable composition is provided by the present invention. The method of forming the film comprises applying the curable composition on a substrate to give a deposit. This method further comprises forming a film on the substrate from the deposit.

DETAILED DESCRIPTION OF THE INVENTION

The present invention provides (A) an additive organopolysiloxane composition. The (A) additive organopolysiloxane composition is particularly well suited for curable compositions, e.g. those which are hydrosilylation-reaction curable. The (A) additive organopolysiloxane composition and a curable composition including the (A) additive organopolysiloxane composition have excellent physical properties and are well suited for diverse end use applications. The curable composition including the (A) additive organopolysiloxane composition forms films having desirable properties, including release properties. For example, the curable composition including the (A) additive organopolysiloxane composition forms films having excellent release properties, including high release force at low peel speeds and low release force at high peel speeds. The (A) additive organopolysiloxane composition, the curable composition, and related methods are described in greater detail below.

The (A) additive organopolysiloxane composition comprises (A1) a branched organopolysiloxane polymer having the following general formula:

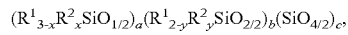

wherein each $R^1$ independently is a substituted or unsubstituted hydrocarbyl group; each $R^2$ independently is an aliphatically unsaturated group; x is from 0 to 3, y is from 0 to 2, with the proviso that x and y are not simultaneously 0; $0 < a \le 0.3$, $0.4 \le b \le 0.97$, and $0 < c \le 0.3$, with the proviso that $a+b+c=1$. The (A1) branched organopolysiloxane polymer has an average of at least three $R^2$ groups per molecule.

The (A1) a branched organopolysiloxane polymer generally comprises M siloxy units (i.e., the $(R^1_{3-x}R^2_xSiO_{1/2})$ siloxy units), D siloxy units (i.e., the $(R^1_{2-y}R^2_ySiO_{2/2})$ siloxy units), and Q siloxy units (i.e., the $(SiO_{4/2})$ siloxy units). Although the (A1) branched organopolysiloxane polymer includes at least one Q siloxy unit, the (A1) branched organopolysiloxane polymer is considered a branched silicone polymer by one of skill in the art, rather than a silicone resin, due to the degree of polymerization (DP) in the (A1) branched organopolysiloxane polymer and the molar fraction of Q siloxy units present therein.

The general formula of the (A1) branched organopolysiloxane polymer is representative of the average formula of the M, D and Q siloxy units. For example, the M siloxy units may be independently selected within the formula ($R^1_{3-x}R^2_xSiO_{1/2}$), and the D siloxy units may be independently selected within the formula ($R^1_{2-y}R^2_ySiO_{2/2}$). The subscripts, or mole fractions of the M, D and Q siloxy units in the (A1) branched organopolysiloxane polymer, are collective based on all M siloxy units, all D siloxy units, and all Q siloxy units, respectively. By way of example, the (A1) branched organopolysiloxane polymer may include M units corresponding to ($R^1_3SiO_{1/2}$), ($R^1_2R^2SiO_{1/2}$), ($R^1R^2_2SiO_{1/2}$), and/or ($R^2_3SiO_{1/2}$), depending on whether subscript x is 0, 1, 2 or 3. Similarly, the (A1) branched organopolysiloxane polymer may include D units corresponding to ($R^1_2SiO_{2/2}$), ($R^1R^2SiO_{2/2}$), and/or ($R^2_2SiO_{2/2}$), depending on whether subscript y is 0, 1 or 2.

Each $R^1$ is an independently selected hydrocarbyl group, which may be substituted or unsubstituted. Each $R^1$ independently may be linear, branched, cyclic, or combinations thereof. Cyclic hydrocarbyl groups encompass aryl groups as well as saturated or non-conjugated cyclic groups. Aryl groups may be monocyclic or polycyclic. One example of a combination of a linear and cyclic hydrocarbyl group is an aralkyl group. By "substituted," it is meant that one or more hydrogen atoms may be replaced with atoms other than hydrogen (e.g. a halogen atom, such as chlorine, fluorine, bromine, etc.), or a carbon atom within the chain of $R^1$ may be replaced with an atom other than carbon, i.e., $R^1$ may include one or more heteroatoms within the chain, such as oxygen, sulfur, nitrogen, etc. Hydrocarbyl groups may be exemplified by methyl, ethyl, propyl, isopropyl, butyl, isobutyl, t-butyl, pentyl, hexyl, cyclohexyl, heptyl, octyl, nonyl, decyl, or a similar alkyl group; phenyl, tolyl, xylyl, naphthyl, or a similar aryl group; a benzyl, phenethyl, or a similar aralkyl group; and 3-chloropropyl, 2-bromoethyl, 3,3,3-trifluoropropyl, or a similar substituted (e.g. halogenated) alkyl group. When $R^1$ is not an aryl group, each $R^1$ is typically saturated and not an alkenyl or alkynyl group.

Each $R^2$ is an independently selected aliphatically unsaturated group, which may alternatively be referred to as ethylenic unsaturation. In specific embodiments, the ethylenic unsaturation in $R^2$ is terminal. Typically, each $R^2$ is independently selected from an alkenyl group and an alkynyl group. "Alkenyl" means an acyclic, branched or unbranched, monovalent hydrocarbon group having one or more carbon-carbon double bonds. Alkenyl groups may have 2 to 30 carbon atoms, alternatively 2 to 24 carbon atoms, alternatively 2 to 20 carbon atoms, alternatively 2 to 12 carbon atoms, alternatively 2 to 10 carbon atoms, and alternatively 2 to 6 carbon atoms. Specific examples thereof include vinyl groups, allyl groups, and hexenyl groups. "Alkynyl" means an acyclic, branched or unbranched, monovalent hydrocarbon group having one or more carbon-carbon triple bonds. Alkynyl groups may have 2 to 30 carbon atoms, alternatively 2 to 24 carbon atoms, alternatively 2 to 20 carbon atoms, alternatively 2 to 12 carbon atoms, alternatively 2 to 10 carbon atoms, and alternatively 2 to 6 carbon atoms. Specific examples thereof include ethynyl, propynyl, and butynyl groups. Various examples of $R^2$ include $CH_2=CH-$, $CH_2=CHCH_2-$, $CH_2=CH(CH_2)_4-$, $CH_2=C(CH_3)CH_2-$, $H_2C=C(CH_3)-$, $H_2C=C(CH_3)-$, $H_2C=C(CH_3)CH_2-$, $H_2C=CHCH_2CH_2-$, $H_2C=CHCH_2CH_2CH_2-$, $HC\equiv C-$, $HC\equiv CCH_2-$, $HC\equiv CCH(CH_3)-$, $HC\equiv CC(CH_3)_2-$, and $HC\equiv CC(CH_3)_2CH_2-$. In various embodiments, each $R^2$ is a vinyl group.

In specific embodiments, the (A1) branched organopolysiloxane polymer has one Q siloxy unit. In other embodiments, the (A1) branched organopolysiloxane polymer has two Q siloxy units, alternatively three Q siloxy units. The (A1) branched organopolysiloxane polymer has a degree of polymerization (DP) of from 5 to 400, alternatively from 10 to 200, alternatively from 14 to 160.

In these or other embodiments, $x \geq 1$ and y is 0 such that $R^2$ is present in M siloxy units (e.g. as vinyldimethyl siloxy units, divinylmethyl siloxy units, and/or trivinyl siloxy units). Alternatively, x is 0 and $y \geq 1$ such that $R^2$ is present in D siloxy units (e.g. as methylvinyl siloxy groups and/or as divinyl siloxy groups). Alternatively still, $x \geq 1$ and $y \geq 1$ such that $R^2$ is present in M siloxy units and D siloxy units.

In specific embodiments in which the (A1) branched organopolysiloxane polymer includes a single Q siloxy unit, the (A1) branched organopolysiloxane polymer has the following general formula:

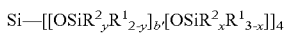

$$Si-[[OSiR^2_yR^1_{2-y}]_{b'}[OSiR^2_xR^1_{3-x}]]_4$$

wherein each $R^1$ and $R^2$ is independently selected and defined above, x and y are defined above, and each b' independently is from 0 to 100. The description above relating to x and y and whether $R^2$ is present in the D siloxy units and/or the M siloxy units applies to these specific embodiments as well. For example, $R^2$ may be pendent (i.e., in D siloxy units) and/or terminal (i.e., in M siloxy units). When $R^2$ is present in M siloxy units, $R^2$ is referred to as being terminal despite the (A1) branched organopolysiloxane being branched rather than being linear (i.e., not having but two terminals).

However, because the (A1) branched organopolysiloxane polymer includes D siloxy units, all instances of b' (i.e., all four instances) cannot simultaneously be 0. The DP of the (A1) branched organopolysiloxane polymer in these embodiments is based on the aggregate or collective amount of b'. The (A1) branched organopolysiloxane polymer includes at least one, alternatively at least two, alternatively at least three, alternatively four, substantially linear, alternatively linear, chains extending from the silicon atom of the Q unit. These substantially linear, alternatively linear, chains correspond to the repeating D siloxy units when any iteration of b' is greater than 0.

In these specific embodiments, the (A1) branched organopolysiloxane polymer includes a single Q siloxy unit and no T siloxy units. T siloxy units, as understood in the art, may be represented by $R^1SiO_{3/2}$ or $R^2SiO_{3/2}$, and include one silicon-bonded substituent (which may be $R^1$, $R^2$, or a substituent other than $R^1$ or $R^2$). The (A1) branched organopolysiloxane polymer includes D siloxy units, corresponding to each iteration of subscript b'. Because b' is independently selected, each linear chain of D siloxy units indicated by subscript b' may vary, i.e., each b' may be the same as or different from one another. One or more instances of b' may be 0 such that an M siloxy unit is bonded directly to the single Q siloxy unit, although typically each M siloxy unit is spaced from the Q siloxy unit by at least one D siloxy unit. The (A1) branched organopolysiloxane polymer may also be generally symmetrical, i.e., when all instances of b' are the same. Each of the linear chains of D siloxy units in the (A1) branched organopolysiloxane polymer terminates with an M siloxy unit.

In specific embodiments, each $R^1$ is methyl (Me), each $R^2$ is vinyl (Vi), y is 0, and x is 1. In these embodiments, the (A1) branched organopolysiloxane polymer has the general formula:

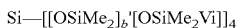

$$Si-[[OSiMe_2]_{b'}[OSiMe_2Vi]]_4$$

where b' is independently selected and defined above. However, as noted above, the M siloxy units and/or D siloxy units may different from one another.

In other specific embodiments, each $R^1$ is methyl (Me), each $R^2$ is vinyl (Vi), y is 1, and x is 0. In these embodiments, the (A1) branched organopolysiloxane polymer has the general formula:

$$Si{-}[[OSiViMe]_{b'}[OSiMe_3]]_4$$

where b' is independently selected and defined above. However, as noted above, the M siloxy units may different from one another.

In yet other specific embodiments, each $R^1$ is methyl (Me), each $R^2$ is vinyl (Vi), y is 1, and x is 1. In these embodiments, the (A1) branched organopolysiloxane polymer has the general formula:

$$Si{-}[[OSiViMe]_{b'}[OSiMe_2Vi]]_4$$

where b' is independently selected and defined above. However, as noted above, the M siloxy units may different from one another.

Regardless of the selection of the (A1) branched organopolysiloxane polymer, the (A1) branched organopolysiloxane polymer has at least three groups designated by $R^2$. In certain embodiments, the (A1) branched organopolysiloxane polymer has a content of (A1) branched organopolysiloxane polymer has a content of $R^2$ of from 2.0 to 7.0, alternatively from 2.0 to 6.0, alternatively from 2.0 to 5.5, wt. % based on the total weight of the (A1) branched organopolysiloxane polymer. This is typically the case when each $R^2$ is vinyl and each $R^1$ is methyl. However, as understood in the art, the same number of $R^2$ groups may constitute a lesser overall wt. % of $R^2$ when $R^1$ is something other than methyl (e.g. ethyl, aryl) and/or when $R^2$ is something other than vinyl (e.g. allyl, hexenyl), which impact the molecular weight of the (A1) branched organopolysiloxane polymer. The content of $R^2$ can be interpreted and calculated using Silicon 29 Nuclear Magnetic Resonance Spectroscopy ($^{29}$Si NMR), as understood in the art.

Combinations of different branched organopolysiloxane polymers may be utilized together as the (A1) branched organopolysiloxane polymer. Methods of preparing branched organopolysiloxane polymers are known in the art.

In certain embodiments, the (A1) branched organopolysiloxane polymer has a viscosity at 25° C. from greater than 0 to less than 400, alternatively from greater than 0 to less than 300, alternatively from greater than 0 to less than 200, centistokes (cSt). In these or other embodiments, the (A1) branched organopolysiloxane polymer has a weight-average molecular weight molecular weight ($M_W$) of from greater than 0 to 15,000, alternatively from 1,000 to 3,000, alternatively from 1,500 to 2,500.

The (A) additive organopolysiloxane composition further comprises (A2) a silicone resin having the following general formula:

$$(R^1{}_{3-z}R^2{}_zSiO_{1/2})_d(SiO_{4/2})_e$$

wherein each $R^1$ and $R^2$ is independently selected and defined above; $0.2 \leq d \leq 0.7$, $0.3 \leq e \leq 0.8$, with the proviso that d+e=1; wherein z is from 0 to 3. However, as described below, the (A2) silicone resin includes at least some content of $R^2$ indicated by z.

The (A2) silicone resin is an MQ silicone resin. The subscript, or mole fraction of the M siloxy units in the (A2) silicone resin, are collective based on all M siloxy units. By way of example, the (A2) silicone resin may include M units corresponding to $(R^1{}_3SiO_{1/2})$, $(R^1{}_2R^2SiO_{1/2})$, $(R^1R^2{}_2SiO_{1/2})$, and/or $(R^2{}_3SiO_{1/2})$, depending on whether subscript z is 0, 1, 2 or 3. As a further example, the general formula of the (A2) silicone resin may alternatively be written as $$(R^1{}_3SiO_{1/2})_{d'}(R^1{}_2R^2SiO_{1/2})_{d''}(R^1R^2{}_2SiO_{1/2})_{d'''}(R^2{}_3SiO_{1/2})_{d''''}(SiO_{4/2})_e$$

where the collective sum of d' to d'''' is equivalent to d in the general formula first introduced above.

In certain embodiments, subscripts d and e are selected such that a ratio of d to e in the (A2) silicone resin is from 0.6:1 to 1.1:1. As known in the art, MQ resins typically include at least some residual hydroxyl content (in the form of silanol groups). For example, in certain embodiments, the (A2) silicone resin may have a content of silanol groups of from greater than 0 to 3.5, alternatively from greater than 0 to 2.0, wt. %. The content of silanol groups is generally based on solids and also can be interpreted and calculated using Silicon 29 Nuclear Magnetic Resonance Spectroscopy ($^{29}$Si NMR).

The (A2) silicone resin includes a content of $R^2$ of from 1.5 to 7.0, alternatively from 2.0 to 7.0, alternatively from 2.0 to 6.0, alternatively from 2.5 to 6.0, alternatively from 3.6 to 6.0, alternatively from 4.0 to 5.5, weight percent (wt. %) based on the total weight of the (A2) silicone resin. This is typically the case when each $R^2$ is vinyl and each $R^1$ is methyl. However, as with the (A1) branched organopolysiloxane polymer, the same number of $R^2$ groups may constitute a lesser overall wt. % of $R^2$ when $R^1$ is something other than methyl (e.g. ethyl, aryl) and/or when $R^2$ is something other than vinyl (e.g. allyl, hexenyl), which impact the molecular weight of the (A2) silicone resin. The content of $R^2$ in the (A2) silicone resin can be interpreted and calculated using Silicon 29 Nuclear Magnetic Resonance Spectroscopy ($^{29}$Si NMR), as understood in the art. Alternatively, the content of $R^2$ in the (A2) silicone resin can be interpreted and calculated using Carbon 13 Nuclear Magnetic Resonance Spectroscopy ($^{13}$C NMR), Hydrogen 1 Nuclear Magnetic Resonance Spectroscopy ($^1$H NMR), Fourier Transform Infrared Spectroscopy (FTIR), or titration, as understood in the art.

Methods of preparing MQ resins are known in the art. The (A2) silicone resin may comprise a combination of different MQ resins together. In certain embodiments, when the (A2) silicone resin comprises a combination of different MQ resins together, the average of each of the MQ resins is within the general formula of the (A2) silicone resin.

In certain embodiments, the (A2) silicone resin has a weight-average molecular weight ($M_W$) of from 1,000 to 50,000, alternatively from 2,000 to 30,000, alternatively from 3,000 to 25,000, Daltons. As understood in the art, $M_W$ of the (A2) silicone resin can be determined via gel permeation chromatography employing a light-scattering detector, a refractive index detector, and a viscosity detector while employing polystyrene standards. The (A2) silicone resin may disposed or dispersed in a vehicle, which acts as a carrier for the (A2) silicone resin.

In certain embodiments, the (A) additive organopolysiloxane composition consists essentially of the (A1) branched organopolysiloxane and the (A2) silicone resin. By "consist essentially of," it is meant that the (A) additive organopolysiloxane composition is free from any components which react or are reactive with the (A1) branched organopolysiloxane and the (A2) silicone resin. However, diluents, vehicles, inhibitors, or other optional components may be optionally present in the (A) additive organopolysiloxane composition. In specific embodiments, the (A) additive organopolysiloxane consists of the (A1) branched organopolysiloxane and the (A2) silicone resin.

In certain embodiments, the (A) additive organopolysiloxane composition comprises the (A1) branched organopolysiloxane polymer in an amount of from 30 to 70 wt. %. In these or other embodiments, the (A) additive organopolysiloxane composition comprises the (A2) silicone resin in an amount of from 70 to 30 wt. % based on the total weight of the (A) additive organopolysiloxane composition.

The (A) additive organopolysiloxane composition may be formed in any manner. For example, the (A1) branched organopolysiloxane polymer and the (A2) silicone resin may be separately prepared and combined in any manner, optionally with mixing and/or in the presence of a diluent or solvent. However, the (A) additive organopolysiloxane composition is typically solventless.

The (A) additive organopolysiloxane composition typically has an overall content of unsaturated groups (i.e., aliphatically unsaturated groups) of greater than 1.5, alternatively greater than 2.0, alternatively greater than 2.5, alternatively greater than 3.0, alternatively greater than 3.1, alternatively greater than 3.2, alternatively greater than 3.3, alternatively greater than 3.4, wt. % based on the total weight of the (A) additive organopolysiloxane composition. For example, the (A) additive organopolysiloxane composition may have an overall content of unsaturated groups of from 1.5 to 7.0, alternatively from 2.5 to 7.0, alternatively from 3.0 to 7.0, alternatively from 3.1 to 7.0, alternatively from 3.2 to 7.0, alternatively from 3.3 to 7.0, alternatively from 3.4 to 7.0, wt. % based on the total weight of the (A) additive organopolysiloxane composition. As noted above relative to the components of the (A) additive organopolysiloxane composition, the wt. % of unsaturated groups may be influenced by selection of substituents, including unsaturated groups, in the components of the (A) additive organopolysiloxane composition. These ranges typically apply when $R^1$ is methyl and $R^2$ is vinyl.

The present invention also provides a curable composition. The curable composition comprises the (A) additive organopolysiloxane composition. The curable composition further comprises (B) an organosilicon compound and (C) a hydrosilylation reaction catalyst. In certain embodiments, the curable composition may be referred to as a releasing coating composition.

The curable composition typically comprises the (A) additive organopolysiloxane composition in an amount of from 1 to 99, alternatively from 5 to 60, alternatively from 5 to 40, weight percent based on the total weight of the curable composition. As understood in the art, the presence or absence of various optional components may influence the content of the (A) additive organopolysiloxane composition.

The (B) organosilicon compound includes at least two silicon-bonded hydrogen atoms per molecule. The (B) organosilicon compound may alternatively be referred to as a crosslinker or a crosslinking agent, as it is reactive with and cross-links the components of the (A) additive organopolysiloxane composition.

The (B) organosilicon compound is typically an organohydrogenpolysiloxane. However, the (B) organosilicon compound may be an organic compound having silicon-hydrogen bonds while being free from siloxane (Si—O—Si) bonds, or a silicone-organic hybrid (e.g. including both siloxane and organic moieties).

For example, the (B) organosilicon compound may be of formula: $H_m R^1_{3-m}Si\text{—}R'\text{—}SiR^1_{3-m'}H_{m'}$, wherein each $R^1$ is independently selected and defined above, subscripts m and m' are independently 0, 1, or 2, with the proviso that $m+m' \geq 2$, and R' is a divalent hydrocarbon group. Typically, the divalent hydrocarbon group is free of aliphatic unsaturation. The divalent hydrocarbon group may be linear, cyclic, branched, aromatic, etc., or may have combinations of such structures. Alternatively, the silicon-bonded hydrogen atoms may also or alternatively be pendent when the (B) organosilicon compound is the organic compound or the silicone-organic hybrid.

When the (B) organosilicon compound comprises the organohydrogenpolysiloxane, the (B) organosilicon compound may be any organohydrogenpolysiloxane having at least two silicon-bonded hydrogen atoms per molecule. The silicon-bonded hydrogen atoms may be terminal, pendent, or in both terminal and pendent locations in the (B) organosilicon compound in such embodiments.

The (B) organosilicon compound may comprise any combination of M, D, T and/or Q siloxy units, so long as the (B) organosilicon compound includes at least two silicon-bonded hydrogen atoms. These siloxy units can be combined in various manners to form cyclic, linear, branched and/or resinous (three-dimensional networked) structures. The (B) organosilicon compound may be monomeric, polymeric, oligomeric, linear, branched, cyclic, and/or resinous depending on the selection of M, D, T, and/or Q units.

Because the (B) organosilicon compound includes an average of at least two silicon-bonded hydrogen atoms per molecule, with reference to the siloxy units set forth above, the (B) organosilicon compound may comprise any of the following siloxy units including silicon-bonded hydrogen atoms, optionally in combination with siloxy units which do not include any silicon-bonded hydrogen atoms: ($R^1_2 HSiO_{1/2}$), ($R^1H_2SiO_{1/2}$), ($H_3SiO_{1/2}$), ($R^1HSiO_{2/2}$), ($H_2SiO_{2/2}$), and/or ($HSiO_{3/2}$), where $R^1$ is independently selected and defined above.

In specific embodiments, the (B) organosilicon compound has the average formula:

$$(R^0{}_3SiO_{1/2})_p(R^0{}_2SiO_{2/2})_q$$

wherein each $R^0$ is independently hydrogen or $R^1$, $p \leq 2$, and $q \geq 1$, so long as at least two of $R^0$ are hydrogen atoms. In specific embodiments, p is from 2 to 10, alternatively from 2 to 8, alternatively from 2 to 6. In these or other embodiments, q is from 0 to 1,000, alternatively from 1 to 500, alternatively from 1 to 200.

In one embodiment, the (B) organosilicon compound is linear and includes pendent silicon-bonded hydrogen atoms. In these embodiments, the (B) organosilicon compound may be a dimethyl, methyl-hydrogen polysiloxane having the average formula;

$$(CH_3)_3SiO[(CH_3)_2SiO]_f[(CH_3)HSiO]_gSi(CH_3)_3$$

where f is from 0 to 1,000 and g is from 2 to 1,000. As understood in the art, the average formula above is exemplary only and can be modified to include hydrocarbyl groups other than methyl, and to include T siloxy and/or Q siloxy units. In specific embodiments, at least 20 mole % of all D siloxy units in this (B) organosilicon compound are indicated by subscript g. In these or other embodiments, f+g is from 10 to 500. Further, in these or other embodiments, each of f and g is independently from 5 to 100.

In these or other embodiments, the (B) organosilicon compound is linear and includes terminal silicon-bonded hydrogen atoms. In these embodiments, the (B) organosilicon compound may be an SiH terminal dimethyl polysiloxane having the average formula:

$$H(CH_3)_2SiO[(CH_3)_2SiO]_fSi(CH_3)_2H$$

where f is as defined above. As understood in the art, the average formula above is exemplary only and can be modified to include hydrocarbyl groups other than methyl, and to include T siloxy and/or Q siloxy units.

Alternatively still, the (B) organosilicon compound may be linear and include both pendent and terminal silicon-bonded hydrogen atoms.

Other examples of suitable organosilicon compounds are those having at least two SiH containing cyclosiloxane rings in one molecule. Such an organosilicon compound may be any organopolysiloxane having at least two cyclosiloxane rings with at least one silicon-bonded hydrogen (SiH) atom on each siloxane ring. Cyclosiloxane rings contain at least three siloxy units (that is the minimum needed in order to form a siloxane ring), and may be any combination of M, D, T, and/or Q siloxy units that forms a cyclic structure, provided that at least one of the cyclic siloxy units on each siloxane ring contains one SiH unit, which may be an M siloxy unit, a D siloxy unit, and/or a T siloxy unit. These siloxy units can be represented as MH, DH, and TH siloxy units respectively when other substituents are methyl.

The (B) organosilicon compound may comprise a combination or two or more different organosilicon compound in concert. The amount of the (B) organosilicon compound in the curable composition is typically selected to provide a molar ratio of silicon-bonded hydrogen atoms to silicon-bonded unsaturated groups (i.e., those represented by $R^2$) of from 0.5:1 to 4:1, alternatively from 1:1 to 3:1, alternatively from 1.5:1 to 2.5:1. This molar ratio is relative too silicon-bonded hydrogen atoms and silicon-bonded unsaturated groups present in the curable composition.

The (C) hydrosilylation catalyst can be any known hydrosilylation catalyst. As known in the art, hydrosilylation catalysts typically comprise a platinum group metal or a compound containing a platinum group metal. However, alternative hydrosilylation catalysts which are based on metals other than platinum group metals (e.g. those based on iron, nickel, cobalt, etc.) may also be utilized.

By platinum group metal it is meant ruthenium, rhodium, palladium, osmium, iridium and platinum as well as any complexes thereof. Typically, the platinum group metal is platinum, based on its high activity in hydrosilylation reactions. Platinum group metal-containing catalysts useful for the hydrosilylation catalyst include the platinum complexes prepared as described by Willing, U.S. Pat. No. 3,419,593, and Brown et al, U.S. Pat. No. 5,175,325, each of which is hereby incorporated by reference to show such complexes and their preparation. Other examples of useful platinum group metal-containing catalysts can be found in Lee et al., U.S. Pat. No. 3,989,668; Chang et al., U.S. Pat. No. 5,036,117; Ashby, U.S. Pat. No. 3,159,601; Larnoreaux, U.S. Pat. No. 3,220,972; Chalk et al., U.S. Pat. No. 3,296,291; Modic, U.S. Pat. No. 3,516,946; Karstedt, U.S. Pat. No. 3,814,730; and Chandra et al., U.S. Pat. No. 3,928,629 all of which are hereby incorporated by reference to disclose platinum group metal-containing catalysts and methods for their preparation. The platinum group-containing catalyst can be platinum group metal' platinum group metal deposited on a carrier, such as silica gel or powdered charcoal; or a compound or complex of a platinum group metal. Specific examples of platinum-containing catalysts include chloroplatinic acid, either in hexahydrate form or anhydrous form, and or a platinum-containing catalyst which is obtained by a method comprising reacting chloroplatinic acid with an aliphatically unsaturated organosilicon compound such as divinyltetramethyldisiloxane, or alkene-platinum-silyl complexes as described in Roy, U.S. Pat. No. 6,605,734, which is also incorporated by reference. These alkene-platinum-silyl complexes may be prepared, for example by mixing 0.015 mole (COD)PtCl$_2$ with 0.045 mole COD and 0.0612 moles HMeSiCl$_2$.

The (C) hydrosilylation catalyst can also be a supported hydrosilylation catalyst comprising a solid support having a platinum group metal on the surface thereof. Examples of supported catalysts include, but are not limited to, platinum on carbon, palladium on carbon, ruthenium on carbon, rhodium on carbon, platinum on silica, palladium on silica, platinum on alumina, palladium on alumina, and ruthenium on alumina.

The (C) hydrosilylation catalyst may also or alternatively be a photoactivatable hydrosilylation catalyst, which may initiate curing via irradiation and/or heat. The photoactivatable hydrosilylation catalyst can be any hydrosilylation catalyst capable of catalyzing a hydrosilylation reaction, particularly upon exposure to radiation having a wavelength of from 150 to 800 nanometers (nm). The suitability of particular photoactivatable hydrosilylation catalysts for use in the composition of the present invention can be readily determined by routine experimentation.

Specific examples of photoactivatable hydrosilylation catalysts suitable for purposes of the (C) hydrosilylation catalyst include, but are not limited to, platinum(II) β-diketonate complexes such as platinum(II) bis(2,4-pentanedioate), platinum(II) bis(2,4-hexanedioate), platinum(II) bis(2,4-heptanedioate), platinum(II) bis(1-phenyl-1,3-butanedioate, platinum(II) bis(1,3-diphenyl-1,3-propanedioate), platinum(II) bis(1,1,1,5,5,5-hexafluoro-2,4-pentanedioate); (η-cyclopentadienyl)trialkylplatinum complexes, such as (Cp)trimethylplatinum, (Cp)ethyldimethylplatinum, (Cp)triethylplatinum, (chloro-Cp)trimethylplatinum, and (trimethylsilyl-Cp)trimethylplatinum, where Cp represents cyclopentadienyl; triazene oxide-transition metal complexes, such as Pt[C$_6$H$_5$NNNOCH$_3$]$_4$, Pt[p-CN—C$_6$H$_4$NNNOC$_6$H$_{11}$]$_4$, Pt[p-H$_3$COC$_6$H$_4$NNNOC$_6$H$_{11}$]$_4$, Pt[p-CH$_3$(CH$_2$)$_x$—C$_6$H$_4$NNNOCH$_3$]$_4$, 1,5-cyclooctadiene.Pt[p-CN—C$_6$H$_4$NNNOC$_6$H$_{11}$]$_2$, 1,5-cyclooctadiene.Pt[p-CH$_3$O—C$_6$H$_4$NNNOCH$_3$]$_2$, [(C$_6$H$_5$)$_3$P]$_3$Rh[p-CN—C$_6$H$_4$NNNOC$_6$H$_{11}$], and Pd[p-CH$_3$(CH$_2$)$_x$—C$_6$H$_4$NNNOCH$_3$]$_2$, where x is 1, 3, 5, 11, or 17; (η-diolefin)(σ-aryl)platinum complexes, such as (η$^4$-1,5-cyclooctadienyl)diphenylplatinum, (η$^4$-1,3,5,7-cyclooctatetraenyl)diphenylplatinum, (η$^4$-2,5-norboradienyl)diphenylplatinum, (η$^4$-1,5-cyclooctadienyl)bis-(4-dimethylam inophenyl)platinum, (η$^4$-1,5-cyclooctadienyl)bis-(4-acetylphenyl)platinum, and (η$^4$-1,5-cyclooctadienyl)bis-(4-trifluormethylphenyl)platinum.

Typically, the photoactivatable hydrosilylation catalyst is a Pt(II) β-diketonate complex and more typically is platinum (II) bis(2,4-pentanedioate). The (C) hydrosilylation catalyst can be a single photoactivatable hydrosilylation catalyst or a mixture comprising two or more different photoactivatable hydrosilylation catalysts.

The (C) hydrosilylation catalyst is typically present in the curable composition in a catalytic amount, which can be readily determined. In certain embodiments, the (C) hydrosilylation catalyst is present in the curable composition in an amount to provide from 1 to 1000, alternatively form 1 to 500, alternatively from 1 to 300, parts per million (ppm) metal, e.g. platinum group metal.

In certain embodiments, the curable composition comprises (D) an organopolysiloxane having at least two silicon-bonded aliphatically unsaturated groups per molecule. The (D) organopolysiloxane is distinguished from the (A1) branched organopolysiloxane polymer and the (A2) silicone resin of the (A) additive organopolysiloxane composition. In various embodiments, the (D) organopolysiloxane may be any of those described above with respect to the (A1) branched organopolysiloxane polymer, so long as the (D) organopolysiloxane is different from the (A1) branched organopolysiloxane polymer. However, the (D) organopolysiloxane can be linear, unlike the (A1) branched organopolysiloxane polymer.

The silicon-bonded aliphatically unsaturated groups may be terminal, pendent, or in both terminal and pendent locations in the (D) organopolysiloxane in such embodiments.

The (D) organopolysiloxane may comprise any combination of M, D, T and/or Q siloxy units, so long as the (D) organopolysiloxane includes at least two silicon-bonded aliphatically unsaturated groups. These siloxy units can be combined in various manners to form cyclic, linear, branched and/or resinous (three-dimensional networked) structures. The (D) organopolysiloxane may be monomeric, polymeric, oligomeric, linear, branched, cyclic, and/or resinous depending on the selection of M, D, T, and/or Q units.

Because the (D) organopolysiloxane includes an average of at least two silicon-bonded aliphatically unsaturated groups per molecule, with reference to the siloxy units set forth above, the (D) organopolysiloxane may comprise any of the following siloxy units including silicon-bonded aliphatically unsaturated groups, optionally in combination with siloxy units which do not include any silicon-bonded aliphatically unsaturated groups: $(R^1{}_2R^2SiO_{1/2})$, $(R^1R^2{}_2SiO_{1/2})$, $(R^2{}_3SiO_{1/2})$, $(R^1R^2SiO_{2/2})$, $(R^2{}_2SiO_{2/2})$, and/or $(R^2SiO_{3/2})$, where $R^1$ and $R^2$ are each independently selected and defined above.

In specific embodiments, the (D) organopolysiloxane has the average formula:

$$(R^1{}_{3-x'}R^2{}_{x'}SiO_{1/2})_{p'}(R^1{}_{2-y'}R^2{}_{y'}SiO_{2/2})_{q'}$$

wherein each $R^1$ and $R^2$ is independently selected and defined above, x' is 0, 1, 2 or 3, y' is 0, 1, or 2, with the proviso that x'+y'≥2, p'≥2, and q'≥1. In specific embodiments, p' is from 2 to 10, alternatively from 2 to 8, alternatively from 2 to 6. In these or other embodiments, q' is from 0 to 1,000, alternatively from 1 to 500, alternatively from 1 to 200.

In one embodiment, the (D) organopolysiloxane is linear and includes pendent silicon-bonded aliphatically unsaturated groups. In these embodiments, the (D) organopolysiloxane may be a dimethyl, methylvinyl polysiloxane having the average formula;

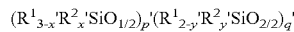

where f' is ≥0 and g' is ≥2, with f'+g' ranging from 1 to 10,000, alternatively from 2 to 5,000, and Vi indicates vinyl. As understood in the art, the average formula above is exemplary only and can be modified to include hydrocarbyl groups other than methyl, aliphatically unsaturated groups other than vinyl, and to include T siloxy and/or Q siloxy units.

In these or other embodiments, the (D) organopolysiloxane is linear and includes terminal silicon-bonded aliphatically unsaturated groups. In these embodiments, the (D) organopolysiloxane may be an dimethylvinyl terminated dimethyl polysiloxane having the average formula:

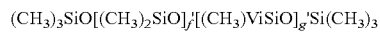

where f" is from 1 to 10,000. As understood in the art, the average formula above is exemplary only and can be modified to include hydrocarbyl groups other than methyl, aliphatically unsaturated groups other than vinyl, and to include T siloxy and/or Q siloxy units.

Alternatively still, the (D) organopolysiloxane may include both pendent and terminal silicon-bonded aliphatically unsaturated groups. In these embodiments, the (D) organopolysiloxane may be a dimethylvinyl terminated dimethyl, methylvinyl polysiloxane having the average formula;

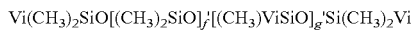

where f', g', and Vi are defined above. As understood in the art, the average formula above is exemplary only and can be modified to include hydrocarbyl groups other than methyl, aliphatically unsaturated groups other than vinyl, and to include T siloxy and/or Q siloxy units.

The (D) organopolysiloxane is optional because the (A) additive organopolysiloxane includes silicon-bonded aliphatically unsaturated groups which are reactive with the silicon-bonded hydrogen atoms of the (B) organosilicon compound. However, the (D) organopolysiloxane is typically present such that the curable composition is curable even in the absence of the (A) additive organopolysiloxane composition, which selectively modifies properties of the cured product thereof.

When utilized, the curable composition typically comprises the (D) organopolysiloxane in an amount of from 1 to 99, alternatively from 40 to 90, weight percent based on the total weight of the curable composition. As understood in the art, the presence or absence of various optional components may influence the content of the (D) organopolysiloxane in the curable composition, as does the relative amount of the (A) additive organopolysiloxane composition therein.

The curable composition typically further comprises (E) a hydrosilylation-reaction inhibitor. The (E) hydrosilylation-reaction inhibitor serves to improve shelf life and stability of the curable composition at ambient conditions and generally prevents premature reaction between the components of the (A) additive organopolysiloxane composition and the (B) organosilicon compound in the presence of the (C) hydrosilylation-reaction catalyst, and, when present, the (D) organopolysiloxane and the (B) organosilicon compound in the presence of the (C) hydrosilylation-reaction catalyst. When the curable composition includes the (D) organopolysiloxane, the curable composition generally comprises the (E) hydrosilylation-reaction inhibitor.

The (E) hydrosilylation-reaction inhibitor may be exemplified by alkyne alcohols (or acetylenic alcohols), cycloalkenylsiloxanes, ketones, ene-yne compounds, triazoles, phosphines, mercaptans, hydrazines, sulphoxides, phosphates, nitriles, hydroperoxides, amines, ethylenically unsaturated isocyanates, fumarates (e.g. dialkyl fumarates, dialkenyl fumarates, dialkoxyalkyl fumarates), maleates (e.g. diallyl maleates), alkenes, and combinations thereof.

Suitable cycloalkenylsiloxanes include methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; suitable ene-yne compounds include 3-methyl-3-penten-1-yne, 3,5-dimethyl-3-hexen-1-yne; suitable triazoles includes benzotriazole; phosphines; mercaptans; hydrazines; suitable amines includes tetramethyl ethylenediamine. Examples of acetylenic alcohol inhibitors include 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol. Alternatively, the (E) hydrosilylation-reaction inhibitor in the curable composition may be a silylated acetylenic inhibitor.

In certain embodiments, the (E) hydrosilylation-reaction inhibitor comprises: (i) an alkene group; (ii) an alkyne group; (iii) an unsaturated ester, alternatively a maleate group; (iv) a fumarate; or (v) any combination of (i) to (iv).

In specific embodiments, the (E) hydrosilylation-reaction inhibitor comprises an alkyne group. The (E) hydrosilylation-reaction inhibitor may include one or more alkyne groups, as well as other functionalities, and may be an organic compound and/or an organosilicon compound.

One specific example of a suitable compound for use as the (E) hydrosilylation-reaction inhibitor is a dicarboxyacetylene ester. Dicarboxyacetylene esters have the following structure:

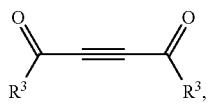

where each $R^3$ is an independently selected alkyl group having, for example, from 1 to 22, alternatively from 1 to 10, alternatively from 1 to 6, alternatively from 1 to 4, carbon atoms. The alkyl groups represented by $R^3$ may optionally and independently be substituted.

Other specific examples of suitable compounds as the (E) hydrosilylation-reaction inhibitor include alcohols or diols. Such compounds may be broadly referred to as alkyne alcohols, and include at least one alkyne group and at least one alcohol group. The alkyne alcohol may be a monohydric alcohol, a diol, a triol, etc. Alkyne alcohols may alternatively be referred to as acetylenic alcohols. Alkyne monohydric alcohols may have the following structure:

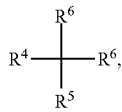

where $R^4$ comprises an alkynyl group, $R^5$ comprises an alcohol group, and each $R^6$ is an independently selected substituted or unsubstituted hydrocarbyl group. Suitable hydrocarbyl groups are defined above and may be branched, cyclic, linear, aryl, etc. Exemplary species of such alkyne monohydric alcohols include:

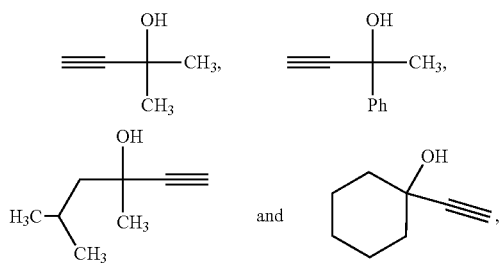

where Ph designates a phenyl group. Specific examples of suitable alkyne diols include the following:

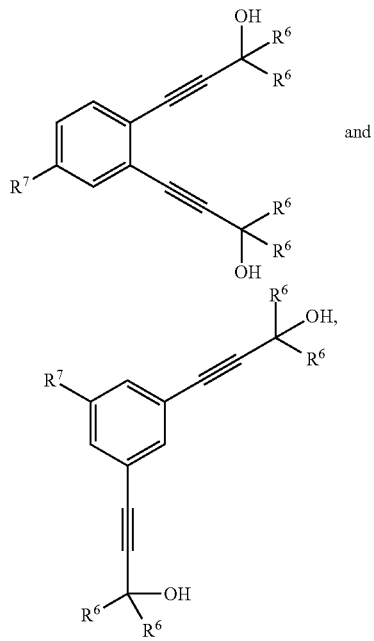

where each $R^6$ is defined above and is independently selected, and each $R^7$ is independently selected from H and $NO_2$. One of skill in the art understands that these specific examples are illustrative only and do not limit the scope of alkyne diols suitable for use as the (E) hydrosilylation-reaction inhibitor. Further examples of suitable alkyne compounds include, for illustrative purposes only, the following alkynes:

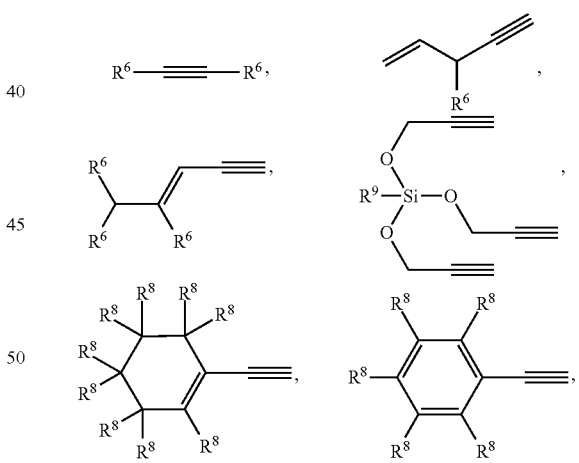

wherein each $R^6$ is independently selected and defined above, each $R^8$ is independently selected from H and a substituted or unsubstituted hydrocarbyl group, and each $R^9$ is an independently selected substituted or unsubstituted hydrocarbyl group. Specific examples of substituted and unsubstituted hydrocarbyl groups are defined above.

Silylated acetylenic inhibitors are exemplified by (3-methyl-1-butyn-3-oxy)trimethylsilane, ((1,1-dimethyl-2-propynyl)oxy)trimethylsilane, bis(3-methyl-1-butyn-3-oxy) dimethylsilane, bis(3-methyl-1-butyn-3-oxy)silanemethylvinylsilane, bis((1,1-dimethyl-2-propynyl)oxy) dimethylsilane, methyl(tris(1,1-dimethyl-2-propynyloxy))

silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy) trimethylsilane, (3-phenyl-1-butyn-3-oxy) diphenylmethylsilane, (3-phenyl-1-butyn-3-oxy) dimethylphenylsilane, (3-phenyl-1-butyn-3-oxy) dimethylvinylsilane, (3-phenyl-1-butyn-3-oxy) dimethylhexenylsilane, (cyclohexyl-1-ethyn-1-oxy) dimethylhexenylsilane, (cyclohexyl-1-ethyn-1-oxy) dimethylvinylsilane, (cyclohexyl-1-ethyn-1-oxy) diphenylmethylsilane, (cyclohexyl-1-ethyn-1-oxy) trimethylsilane, and combinations thereof. Alternatively, the (E) hydrosilylation-reaction inhibitor is exemplified by methyl(tris(1,1-dimethyl-2-propynyloxy))silane, ((1,1-dimethyl-2-propynyl)oxy)trimethylsilane, or a combination thereof. Specific examples of suitable species for the (E) hydrosilylation-reaction inhibitor include, but are not limited to, trans-stilbene, cis-stilbene, diphenylacetylene, 3,3-dimethyl-1-butyne, bicyclo[2.2.1] hept-2-ene, bicyclo [2.2.1] hepta-2,5-diene, cyclohexylacetylene, 1-ethynylcyclohexene, benzyl alcohol, acetylacetone, 2,4,7,9-tetramethyl-5-decyne-4,7-diol, 2-butyn-1-ol, 4-pentyn-1-ol, 2-butyne-1,4-diol, methyl propargyl ether, 3-butyn-1-ol, propargyl alcohol, 3-butyn-2-ol, 3-methyl-1-penten-4-yn-3-ol, 3,3-diethoxy-1-propyne, 2-methyl-3-butyn-2-ol, 3,5-dimethyl-1-hexyn-3-ol, 1-ethynylcyclopentanol, 1-ethynyl-1-cyclohexanol, 1-phenyl-2-propyn-1-ol, 2-phenyl-3-butyn-2-ol, 1,1-diphenyl-2-propyn-1-ol, tetraethyl ethylenetetracarboxylate, ethyl cinnamate, ethyl sorbate, 1,4-naphthoquinone, maleic anhydride, diethyl fumarate, diethyl maleate, diallyl fumarate, diallyl maleate, 2-butyne-1,4-diol diacetate, methyl propiolate, ethyl propiolate, ethyl phenylpropiolate, dimethyl acetylenedicarboxylate, diethyl acetylenedicarboxylate, di-tert-butyl acetylenedicarboxylate, 2,4,6,8-tetramethyl-2,4,6,8-tetravinylcyclotetrasiloxane, tetracyanoethylene, 1,3,5-triallyl-1,3,5-triazine-2,4,6 (1H,3H,5H)-trione, 3-dimethylamino-1-propyne, n-methylpropargylamine, propargylamine, and 1-ethynylcyclohexylamine.

Combinations of different compounds may be utilized together or in combination as the (E) hydrosilylation-reaction inhibitor. The (E) hydrosilylation-reaction inhibitor is typically present in the curable composition in an amount sufficient to prevent the reaction of the (A) additive organopolysiloxane composition, the (B) organosilicon compound and, if present, the (D) organopolysiloxane, at ambient conditions. At least some reaction may occur despite the presence of the (E) hydrosilylation-reaction inhibitor, but the curable composition remains curable until application of a curing condition. The curable composition may additionally be a one component (1 k), two component (2 k), or multi-component system. Typically, the (C) hydrosilylation catalyst is not combined with the (A) additive organopolysiloxane composition, the (B) organosilicon compound, or the (D) organopolysiloxane until after incorporation of the (E) hydrosilylation-reaction inhibitor.

In certain embodiments, the curable composition comprises the (E) hydrosilylation-reaction inhibitor in an amount of from greater than 0 to 15, alternatively from 0.01 to 10, weight percent based on the total weight of the curable composition. In these or other embodiments, the curable composition comprises the (E) hydrosilylation-reaction inhibitor in a molar ratio of at least 20:1, alternatively at least 25:1, alternatively at least 30:1, of the (E) hydrosilylation-reaction inhibitor relative to the (C) hydrosilylation-reaction catalyst.

In various embodiments, the curable composition further comprises (F) an anchorage additive.

Suitable anchorage additives include a transition metal chelate, a hydrocarbonoxysilane such as an alkoxysilane, a combination of an alkoxysilane and a hydroxy-functional polyorganosiloxane, or a combination thereof. Anchorage additives are known in the art and may comprise silanes including at least one SiC bonded substituent having an adhesion-promoting group, such as, epoxy, acetoxy or acrylate groups. The adhesion-promoting group may additionally or alternatively be any hydrolysable group which does not impact the (C) hydrosilylation catalyst. Alternatively, the (F) anchorage additive may comprise a partial condensate of such a silane, e.g. an organopolysiloxane having an adhesion-promoting group. Alternatively still, the (F) anchorage additive may comprise a combination of an alkoxysilane and a hydroxy-functional polyorganosiloxane.

Alternatively, the (F) anchorage additive may comprise an unsaturated or epoxy-functional compound. The (F) anchorage additive may comprise an unsaturated or epoxy-functional alkoxysilane. For example, the functional alkoxysilane can include at least one unsaturated organic group or an epoxy-functional organic group. Epoxy-functional organic groups are exemplified by 3-glycidoxypropyl and (epoxycyclohexyl)ethyl. Unsaturated organic groups are exemplified by 3-methacryloyloxypropyl, 3-acryloyloxypropyl, and unsaturated monovalent hydrocarbon groups such as vinyl, allyl, hexenyl, undecylenyl. One specific example of an unsaturated compound is vinyltriacetoxysilane.

Specific examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof.

The (F) anchorage additive may also comprise the reaction product or partial reaction product of one or more of these compounds. For example, in a specific embodiment, the (F) anchorage additive may comprise the reaction product or partial reaction product of vinyltriacetoxysilane and 3-glycidoxypropyltrimethoxysilane. Alternatively or in addition, the (F) anchorage additive may comprise alkoxy or alkenyl functional siloxanes.

Alternatively, the (F) anchorage additive may comprise an epoxy-functional siloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. The (F) anchorage additive may comprise a combination of an epoxy-functional alkoxysilane and an epoxy-functional siloxane. For example, the (F) anchorage additive is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

Alternatively, the (F) anchorage additive may comprise a transition metal chelate. Suitable transition metal chelates include titanates, zirconates such as zirconium acetylacetonate, aluminum chelates such as aluminum acetylacetonate, and combinations thereof. Alternatively, the (F) anchorage additive may comprise a combination of a transition metal chelate with an alkoxysilane, such as a combination of glycidoxypropyltrimethoxysilane with an aluminum chelate or a zirconium chelate.

In various embodiments, the curable composition further comprises (G) an anti-mist additive. The (G) anti-mist additive may be any compound or component suitable for reducing, minimizing, or eliminating misting during applications of the curable composition. Because the curable composition is typically solventless, high speed application of the curable composition to a substrate via a coating head or applicator may result in generation of mist from the curable composition.

In specific embodiments, the (G) anti-mist additive comprises an anti-mist organopolysiloxane. The anti-mist organopolysiloxane is different from the components of the (A) additive organopolysiloxane composition and the (D) organopolysiloxane, if present in the curable composition. In a specific embodiment, the (G) anti-mist additive comprises a Q-branched dimethylvinyl terminated organopolysiloxane. The (G) anti-mist additive may have a viscosity of from 30,000 to 50,000, alternatively from 35,000 to 45,000, centipoise at 25° C.

The curable composition may further comprise other optional additives such as colorants, dyes, pigments, non-reactive silicone fluids, preservatives and/or fragrances. In certain embodiments, the curable composition comprises only components (A)-(C), alternatively only components (A)-(D), alternatively only components (A)-(E), alternatively components (A)-(E) and optionally any of (F) and/or (G).

A method of preparing the curable composition is also provided. The method comprises combining the (A) additive organopolysiloxane, the (B) organosilicon compound having at least two silicon-bonded hydrogen atoms per molecule, and the (C) hydrosilylation catalyst to give the curable composition. When components (D), (E), (F), and/or (G) are also present in the curable composition, the method comprises combining such components along with components (A), (B), and (C).

The components may be combined via any suitable technique and in any order of addition. In certain embodiments, the (E) hydrosilylation-reaction inhibitor is utilized and combined with the other components prior to incorporation of the (C) hydrosilylation catalyst. In the absence of the (E) hydrosilylation-reaction inhibitor, the components of the curable composition may begin to react in the presence of the (C) hydrosilylation catalyst once combined.

Alternatively, the curable composition can be prepared for example by combining components (A) and (C) as a first mixture, and mixing component (B) with the rest of component (C) as a second mixture. The first and second mixtures are not reactive until combined to give the curable composition. Alternatively each of the components may be stored and supplied separately. When the curable composition does not include the (E) hydrosilylation-reaction inhibitor, the curable composition is typically prepared immediately prior to end use application. In contrast, inclusion of the (E) hydrosilylation-reaction inhibitor extends shelf-life and stability of the curable composition.

The present invention also provides method of forming a film. The film may alternatively be referred to as a coating, as the film is formed on a substrate. The film may also be referred to as a release liner or liner depending on end use applications thereof. The film may be peelable from the substrate, or may be chemically and/or physically bonded to the substrate.

The method comprises applying the curable composition on a substrate to give a deposit. The method further comprises forming a film on the substrate from the deposit.

The substrate is not limited and may be any substrate depending on an end use application of the film. Examples of suitable substrates include cellulosic materials, such as paper, cardboard and wood; metals, such as aluminum, iron, steel, or an alloy thereof; siliceous materials, such as ceramics, glass and concrete. The substrate may also be a plastic substrate. Specific examples of suitable plastic substrates include polyamides (PA); polyesters such as polyethylene terephthalates (PET), polybutylene terephthalates (PET), polytrimethylene terephthalates (PTT), polyethylene naphthalates (PEN), liquid crystalline polyesters, and the like; polyolef ins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyvinyl alcohols (PVA); polyetheretherketones (PEEK); polyetherketoneketones (PEKK); polyarylates (PAR); polyethernitriles (PEN); phenolic resins; phenoxy resins; celluloses such as triacetylcellulose, diacetylcellulose, cellophane, etc.; fluorinated resins, such as polytetrafluoroethylenes; thermoplastic elastomers, such as polystyrene types, polyolef in types, polyurethane types, polyester types, polyamide types, polybutadiene types, polyisoprene types, fluoro types, and the like; and copolymers, modifications, and combinations thereof.

In view of the excellent controlled release properties of the film, the substrate may be selected based on desired end use applications involving pressure sensitive adhesives. For example, pressure sensitive adhesives may be controllably released from the film, and thus the film may be utilized to form tapes or other substrates for pressure sensitive adhesives. In these embodiments, the substrate may be flexible. However, the substrate may alternatively be rigid, or a combination of rigid and flexible. The substrate may be continuous or discontinuous in any property or dimension.

Typically, the curable composition is applied to the substrate in wet form via a wet coating technique. In certain embodiments, the composition is applied by i) spin coating; ii) brush coating; iii) drop coating; iv) spray coating; v) dip coating; vi) roll coating; vii) flow coating; viii) slot coating; ix) gravure coating; or x) a combination of any of i) to ix). In specific embodiments in which the substrate is flexible, e.g. paper, the wet coating technique may utilize a trailing blade coater, kiss rolls, gravure rolls, and/or offset printing rolls.

In specific embodiments, the amount of the curable composition applied to the substrate is an amount between 0.1 to 2.0 grams per square meter of surface of the substrate.

The deposit formed by applying the curable composition is typically an uncured film. The uncured film may have undergone at least partial curing, but remains curable upon application of a curing condition (e.g. heat).

Forming the film from the deposit generally comprises curing the deposit.

The deposit is typically cured at an elevated temperature for a period of time. The elevated temperature is typically from to 50 to 300, alternatively from 100 to 250, alternatively from 150 to 200, °C. The period of time is typically sufficient to effect curing, i.e., crosslinking, of the deposit comprising the curable composition. In certain embodiments, the period of time is a function of dimensions of the deposit. In certain embodiments, the period of time is less than 1 minute, alternatively less than 30 seconds, alternatively less than 15 seconds, alternatively less than 10 seconds, alternatively less than 5 seconds. The source of heat may be any suitable source. For example, the substrate may be heated such that the deposit cures upon contact with the substrate. Alternatively, the substrate and deposit may be placed in or passed through an oven.

Depending on a thickness and other dimensions of the deposit and film, the film could also be formed via an iterative process.

In specific embodiments, an adhesive is laminated on the film formed from the deposit. The adhesive may be any adhesive, e.g. an acrylate-based adhesive, a silicone-based adhesive, etc. The film of the present invention advantageously delivers high release force at low peel speeds and low release force at high peel speeds. In hand peel applications, a low release force may lead to undesirable dispensing of a label, which is avoided via the high release force at low peel speeds provided by the inventive film.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention.

Various additive organopolysiloxane compositions are prepared in accordance with the subject disclosure. More specifically, additive organopolysiloxane compositions are prepared and utilized for purposes of preparing curable compositions in accordance with the subject disclosure. Other additive organopolysiloxane compositions, and curable compositions prepared therefrom, are also prepared and compared to the additive organopolysiloxane compositions and curable compositions of the subject disclosure.

Preparation Example 1: Additive Organopolysiloxane Compositions

In general, the additive organopolysiloxane compositions are prepared by combining an organopolysiloxane polymer (organopolysiloxane polymer 1) and a silicone resin together in a jar at ambient temperature to form a mixture. The mixture is then stripped using a wipe film evaporator (120-150° C.; <1 Torr), and optionally combined with an additional amount of organopolysiloxane polymer (organopolysiloxane polymer 2), to give the particular additive organopolysiloxane composition.

Practical Examples 1-11 & Comparative Examples 1 and 2

In particular, 13 different additive organopolysiloxane compositions (Practical Examples 1-11 and Comparative Examples 1 and 2) were prepared according to the general procedure described in Preparation Example 1 above. The specific organopolysiloxane polymers and silicone resins utilized to prepare the 13 different additive organopolysiloxane compositions, along with their respective amounts, are shown below in Table 1.

TABLE 1

| | Organopolysiloxane Polymer 1 | Amount (g) | Silicone Resin | Amount (g) | Organopolysiloxane Polymer 2 | Amount (g) |
|---|---|---|---|---|---|---|
| Practical Example 1 | P-1 | 217.21 | SR-3 | 254.47 | — | — |
| Practical Example 2 | P-1 | 651.64 | SR-1 | 733.99 | — | — |
| Practical Example 3 | P-1 | 651.64 | SR-1 | 733.99 | P-1 | 37.5 |
| Practical Example 4 | P-1 | 377.53 | SR-4 | 500.00 | — | — |
| Practical Example 5 | P-1 | 166.95 | SR-4 | 232.75 | P-1 | 37.5 |
| Practical Example 6 | P-2 | 581.00 | SR-4 | 761.78 | — | — |

TABLE 1-continued

|  | Organo-polysiloxane Polymer 1 | Amount (g) | Silicone Resin | Amount (g) | Organo-polysiloxane Polymer 2 | Amount (g) |
|---|---|---|---|---|---|---|
| Practical Example 7 | P-2 | 581.00 | SR-4 | 761.78 | P-2 | 37.5 |
| Practical Example 8 | P-2 | 676.24 | SR-1 | 733.99 | P-2 | 37.5 |
| Practical Example 9 | P-2 | 535.89 | SR-2 | 895.52 | P-2 | 30.3 |
| Practical Example 10 | P-2 | 676.24 | SR-1 | 733.99 | — | — |
| Practical Example 11 | P-2 | 535.89 | SR-2 | 895.52 | — | — |
| Comparative Example 1 | P-3 | 500.00 | SR-5 | 500.00 | — | — |
| Comparative Example 2 | P-4 | 298.89 | SR-3 | 303.19 | — | — |

Organopolysiloxane Polymer P-1 is a branched vinyldimethylsiloxy-functionalized polysiloxane consisting of M, D, and Q siloxy units and having 3% vinyl content (wt. %) and a degree of polymerization (DP) of 28.

Organopolysiloxane Polymer P-2 is a branched vinyldimethylsiloxy-functionalized polysiloxane consisting of M, D and Q siloxy units and having 5.8% vinyl content and a DP of 12.

Organopolysiloxane Polymer P-3 is a linear vinyldimethylsiloxy-functionalized polysiloxane having 3% vinyl content.

Organopolysiloxane Polymer P-4 is a linear vinyldimethylsiloxy-functionalized polysiloxane having 2.7% vinyl content and a DP of 25.

Silicone Resin SR-1 is a is a vinyldimethylsiloxy-functionalized MQ resin having an M:Q ratio of 0.88:1.00, 2.1% vinyl content, and 1.8% OH content, utilized as 76.84 wt. % solids in xylene.

Silicone Resin SR-2 is a vinyldimethylsiloxy-functionalized MQ resin having an M:Q ratio of 0.99:1.00, 3.2% vinyl content, and 0.9% OH content, utilized as 77.72 wt. % solids in xylene.

Silicone Resin SR-3 is a vinyldimethylsiloxy-functionalized MQ resin with an M:Q ratio of 0.88:1.00, 5.0 wt. % vinyl content, and 1.0% OH content, utilized as 73.88 wt. % solids in xylene.

Silicone Resin SR-4 is a vinyldimethylsiloxy-functionalized MQ resin with an M:Q ratio of 0.94:1.00, 4.1% vinyl content, and 1.5 wt. % OH content, utilized as 63.97% wt. % solids in xylene.

Silicone Resin SR-5 is a combination of a vinyldimethylsiloxy-functionalized MQ resin with 2% vinyl content (94 wt. %), and an MQ resin with 0% vinyl content (6 wt. %).

A sample of each of the additive organopolysiloxane compositions prepared above is analyzed via $^{29}Si$ NMR to determine vinyl content (wt. %). The vinyl content and ratio of silicone resin to organopolysiloxane polymer (wt./wt., calc.) for each of the additive organopolysiloxane compositions of Practical Examples 1-11 and Comparative Examples 1 and 2 are shown in Table 2 below.

TABLE 2

|  | Vinyl (wt. %) | Resin:Polymer Ratio (wt./wt.) |
|---|---|---|
| Practical Example 1 | 3.55 | 47/53 |
| Practical Example 2 | 2.49 | 47/53 |
| Practical Example 3 | 2.65 | 42/58 |

TABLE 2-continued

|  | Vinyl (wt. %) | Resin:Polymer Ratio (wt./wt.) |
|---|---|---|
| Practical Example 4 | 3.56 | 47/53 |
| Practical Example 5 | 3.57 | 42/58 |
| Practical Example 6 | 5.03 | 47/53 |
| Practical Example 7 | 5.07 | 42/58 |
| Practical Example 8 | 4.36 | 42/58 |
| Practical Example 9 | 4.37 | 53/47 |
| Practical Example 10 | 4.2 | 47/53 |
| Practical Example 11 | 4.29 | 58/42 |
| Comparative Example 1 | 2.18 | 50/50 |
| Comparative Example 2 | 3.26 | 50/50 |

Preparation Example 2: Curable Compositions

The curable compositions are prepared by mixing together (via overhead mixer, ~1400 rpm), in order, an organosilicon compound, an additive organopolysiloxane composition, a reaction inhibitor, an anti-mist additive, a cross-linker, and a hydrosilylation catalyst.

Practical Examples 12-20 & Comparative Examples 3-5

The additive organopolysiloxane compositions of Practical Examples 1-9 and Comparative Examples 1 and 2 were utilized to prepare 12 different curable compositions according to the general procedure described in Preparation Example 2 above. Practical Example 12 and Comparative Examples 3-4 are based on a concentration in the curable composition of the corresponding Additive Organopolysiloxane Composition of 50 wt. % and are shown in Table 3 below. Practical Examples 13-20 and Comparative Example 5 are based on a concentration in the curable composition of the corresponding Additive Organopolysiloxane Composition of 30 wt. % and are shown in Table 4 below. In Tables 3 and 4, P.E. indicates Practical Example and C.E. indicates Comparative Example.

TABLE 3

| Example No. | Additive Organopolysiloxane Composition Identity | (g) | (D) (g) | (E) (g) | (G) (g) | (B) (g) | (C) (g) |
|---|---|---|---|---|---|---|---|
| P.E. 12 | P.E. 1 | 359.28 | 241.25 | 1.04 | 4.93 | 107.95 | 5.55 |
| C.E. 3 | C.E. 1 | 360.00 | 271.64 | 0.36 | 5.55 | 76.9 | 5.55 |
| C.E. 4 | C.E. 2 | 359.28 | 247.81 | 1.05 | 5.06 | 101.25 | 5.55 |

TABLE 4

| Example No. | Additive Organopolysiloxane Composition Identity | (g) | (D) (g) | (E) (g) | (G) (g) | (B) (g) | (C) (g) |
|---|---|---|---|---|---|---|---|
| P.E. 13 | P.E. 2 | 210 | 405.73 | 0.91 | 8.1146 | 69.853 | 5.39 |
| P.E. 14 | P.E. 3 | 210 | 403.65 | 0.91 | 8.073 | 71.981 | 5.39 |
| P.E. 15 | P.E. 4 | 210 | 391.81 | 0.91 | 7.8362 | 84.056 | 5.39 |
| P.E. 16 | P.E. 5 | 210 | 391.68 | 0.91 | 7.8336 | 84.189 | 5.39 |
| P.E. 17 | P.E. 6 | 210 | 372.63 | 0.91 | 7.4526 | 103.621 | 5.39 |
| P.E. 18 | P.E. 7 | 210 | 372.14 | 0.91 | 7.4428 | 104.118 | 5.39 |
| P.E. 19 | P.E. 8 | 210 | 381.36 | 0.91 | 7.6272 | 94.71 | 5.39 |
| P.E. 20 | P.E. 9 | 210 | 381.23 | 0.91 | 7.6246 | 94.85 | 5.39 |
| C.E. 5 | C.E. 1 | 210 | 410.25 | 0.385 | 8.205 | 65.765 | 5.39 |

Component (D) is a branched vinyldimethylsiloxy-functionalized polysiloxane having 1.2% vinyl content and a DP of 160.

Component (E) is a hydrosilylation-reaction inhibitor comprising ethynyl cyclohexanol (EtCH).

Component (G) is an anti-mist additive comprising a vinyldimethylsiloxy-functionalized polysiloxane having a viscosity of 40,000 cP at 25° C.

Component (B) is an organosilicon compound comprising an Si—H functional organopolysiloxane having 1.19% hydrogen content.

Component (C) is a Hydrosilylation Catalyst comprising 1,3-diethenyl-1,1,3,3-tetramethyldisiloxane complexes of platinum in vinyldimethylsiloxy-functional polysiloxane.

Each of curable compositions of Practical Examples 12-20 & Comparative Examples 3-5 is coated on a liner, as described below, within one hour of preparation.

Preparation Example 3: Film Formation

Within one hour of formation, a sample of each of the curable compositions of Practical Examples 12-20 & Comparative Examples 3-5 is applied (3 roll gravure coating head; coating weight of 0.8-0.9#/rm) onto a substrate (liner paper) to give a deposit. The deposit is then heated (4 second pass through an oven, 360° F.) to form a film (i.e., a cured composition) on the substrate via curing.

Preparation Example 4: Laminate Formation

The films formed in Preparation Example 3 above are each coated with an adhesive (coating weight of 11-12#/rm) and passed through an oven with two heated zones (first zone at 110° F.; second zone at 220° F.) for 18 seconds to dry the adhesive and thereby give an adhesive layer adjacent the cured composition. A second substrate (face stock) is then laminated onto the adhesive layer to give a final laminate comprising, sequentially, the second substrate, the adhesive layer, the cured composition, and the substrate.

Laminate Analysis

A test sample of each laminate prepared in Preparation Example 4 above is aged for 7 days (70° F.; 50% relative humidity) to give an aged laminate. The mechanical peel force required to delaminate the aged laminate is measured at a 180 degree peel angle according to the FTM 3: Low Speed Release Force (0.3 Meters per minute (MPM)) and FTM 4: High Speed Release Force (10, 300 MPM) techniques set forth in the FINAT Technical Handbook 6$^{th}$ Edition (2001). In particular, the cured adhesive layer is delaminated from the cured composition at each speed, and the release force at each speed is recorded and compared with a reference formulation (Comparative Example 1). The improvement of release force at high speed (300 MPM) over the reference formulation is then quantified using Equation 1:

% Delta(High Speed)=100×[(Release force at 300 MPM)−(Release force at 10 MPM)]/(Release force at 10 MPM)

The smaller the % Delta value, the more effective the cured composition in minimizing the increase in the release force at high speed relative to the reference formulation (i.e., Comparative Example 1).

The results of the mechanical peel force analysis of the laminates prepared from the curable compositions of Practical Example 12 as compared to those which are obtained from Comparative Examples 3 and 4 are set forth below in Table 5.

TABLE 5

| Example No. | 0.3 MPM | % increase at 0.3 MPM from Comparative Example 3 | 10 MPM | 100 MPM | 300 MPM | % Δ (300 MPM from 10 MPM) |
|---|---|---|---|---|---|---|
| 12 | 30.7 | 46 | 17.0 | 16.3 | 15.2 | −10.6 |
| C.E. 3 | 21.0 | — | 14.5 | 21.6 | 21.9 | 51.0 |
| C.E. 4 | 23.8 | 13 | 13.2 | 17.8 | 19.6 | 48.5 |

The results of the mechanical peel force analysis of the laminates prepared from the curable compositions of Practical Examples 13-20 as compared to that which is obtained from Comparative Example 5 is set forth below in Table 6.

TABLE 6

| Example No. | 0.3 MPM | % increase at 0.3 MPM from Comparative Example 5 | 10 MPM | 100 MPM | 300 MPM | % Δ (300 MPM from 10 MPM) |
|---|---|---|---|---|---|---|
| P.E. 13 | 14 | 11 | 10 | 18 | 22 | 135 |
| P.E. 14 | 14 | 17 | 11 | 18 | 23 | 105 |
| P.E. 15 | 16 | 28 | 10 | 15 | 18 | 78 |
| P.E. 16 | 15 | 21 | 10 | 16 | 19 | 88 |
| P.E. 17 | 23 | 88 | 14 | 15 | 17 | 24 |
| P.E. 18 | 21 | 74 | 15 | 15 | 17 | 14 |
| P.E. 19 | 21 | 75 | 14 | 18 | 20 | 37 |
| P.E. 20 | 20 | 64 | 13 | 17 | 20 | 56 |
| C.E. 5 | 12 | — | 10 | 19 | 24 | 140 |

Results

As shown above, a comparison of the results of the mechanical peel force analysis of the laminates prepared from the curable compositions of Practical Examples 12 and Comparative Examples 3 and 4 demonstrate that the high vinyl content of Practical Example 12 in combination with its branched structure significantly impacts the low-speed mechanical release forces, which are critical for hand-peel applications. A low release force is undesirable as it may lead to inadvertent dispensing of a label, for example. Moreover, Practical Example 12 shows an atypical decrease in mechanical release force with an increase in release rate. This characteristic is desirable as delamination forces normally associated with increases in peel rate can cause web breaks if too great. It is also observed that Practical Examples 13-20, which are formulated with the additive organopolysiloxane compositions of Practical Examples 3-9, show higher low-speed mechanical release forces than that of Comparative Example 5, which is formulated with a linear organopolysiloxane polymer.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. An (A) additive organopolysiloxane composition comprising:

(A1) a branched organopolysiloxane polymer having the following general formula:

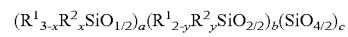

wherein each $R^1$ independently is a substituted or unsubstituted hydrocarbyl group; each $R^2$ independently is an aliphatically unsaturated group; x is from 0 to 3, y is from 0 to 2, with the proviso that x and y are not simultaneously 0; 0<a≤0.3, 0.4≤b≤0.97, and 0<c≤0.3, with the proviso that a+b+c=1; wherein said (A1) branched organopolysiloxane polymer has an average of at least three $R^2$ groups per molecule; and (A2) a silicone resin having the following general formula:

$(R^1{}_{3-z}R^2{}_zSiO_{1/2})_d(SiO_{4/2})_e$ wherein each $R^1$ and $R^2$ is independently selected and defined above; 0.2≤d≤0.7, 0.3≤e≤0.8, with the proviso that d+e=1; wherein z is from 0 to 3 with the proviso that said (A2) silicone resin includes a content of $R^2$ of from 1.5 to 7.0 weight percent (wt. %) based on the total weight of said (A2) silicone resin;

wherein said additive organopolysiloxane composition has a content of aliphatically unsaturated groups of from 1.5 to 7.0 wt. %.

2. The additive organopolysiloxane composition of claim 1, having a content of aliphatically unsaturated groups of from 2.5 to 7.0 wt. %.

3. The additive organopolysiloxane composition of claim 1, having a content of aliphatically unsaturated groups of from 3.0 to 7.0 wt. %.

4. The additive organopolysiloxane composition of claim 1, wherein:
(i) said (A1) branched organopolysiloxane polymer has a content of $R^2$ of from 2.0 to 7.0 wt. % based on the total weight of said (A1) branched organopolysiloxane polymer;
(ii) a ratio of d to e in said (A2) silicone resin is from 0.6:1 to 1.1:1; or
(iii) both (i) and (ii).

5. The additive organopolysiloxane composition of claim 1, wherein said (A1) branched organopolysiloxane polymer has the following general formula:

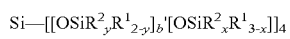
$Si-[[OSiR^2{}_yR^1{}_{2-y}]_{b'}[OSiR^2{}_xR^1{}_{3-x}]]_4$ wherein each $R^1$ and $R^2$ is independently selected and defined above, x and y are defined above, and each b' independently is from 0 to 100.

6. The additive organopolysiloxane composition of claim 1, wherein:
(i) said (A) additive organopolysiloxane composition consists of said (A1) branched organopolysiloxane polymer and said (A2) silicone resin;
(ii) said (A) additive organopolysiloxane composition comprises said (A1) branched organopolysiloxane polymer in an amount of from 30 to 70 wt. % and said (A2) silicone resin in an amount of from 70 to 30 wt. % based on the total weight of said (A) additive organopolysiloxane composition; or
(iii) both (i) and (ii).

7. A curable composition, comprising:
(A) an additive organopolysiloxane composition, said (A) additive organopolysiloxane being that of claim 1;
(B) an organosilicon compound having at least two silicon-bonded hydrogen atoms per molecule; and
(C) a hydrosilylation catalyst.

8. The curable composition of claim 7, further comprising:
(i) (D) an organopolysiloxane having at least two silicon-bonded aliphatically unsaturated groups per molecule;
(ii) (E) a hydrosilylation-reaction inhibitor;
(iii) (F) an anchorage additive;
(iv) (G) an anti-mist additive; or
(v) any combination of (i)-(iv).

9. The curable composition of claim 8, further comprising said (D) organopolysiloxane having at least two silicon-bonded aliphatically unsaturated groups per molecule.

10. The curable composition of claim 8, wherein:
(i) said (A) additive organopolysiloxane composition is present in an amount of from 5 to 60 wt. %; and
(ii) said (D) organopolysiloxane having at least two silicon-bonded aliphatically unsaturated groups per molecule is present in an amount of from 40 to 90 wt. %, each based on the total weight of said curable composition.

11. The curable composition of claim 7, wherein a ratio of silicon-bonded hydrogen atoms to silicon-bonded aliphatically unsaturated groups is from 0.5:1 to 4:1.

12. A method of preparing the curable composition of claim 7, said method comprising combining the (A) additive organopolysiloxane, the (B) organosilicon compound having at least two silicon-bonded hydrogen atoms per molecule, and the (C) hydrosilylation catalyst to give the curable composition.

13. A method of forming a film, said method comprising:
applying a curable composition on a substrate to give a deposit; and
forming a film on the substrate from the deposit;
wherein the curable composition is the curable composition of claim 7.

14. A release coating composition, comprising:
(A) an additive organopolysiloxane composition, said (A) additive organopolysiloxane being that of claim 1;
(B) an organosilicon compound having at least two silicon-bonded hydrogen atoms per molecule;
(C) a hydrosilylation catalyst;
(D) an organopolysiloxane having at least two silicon-bonded aliphatically unsaturated groups per molecule; and
(E) a hydrosilylation-reaction inhibitor.

* * * * *